United States Patent [19]

Frank et al.

[11] 4,092,141
[45] May 30, 1978

[54] METHOD AND APPARATUS FOR HANDLING GLASS SHEETS FOR SHAPING AND COOLING

[75] Inventors: Robert G. Frank, Murrysville; DeWitt W. Lampman, Monroeville, both of Pa.

[73] Assignee: PPG Industries, Inc., Pittsburgh, Pa.

[21] Appl. No.: 756,208

[22] Filed: Jan. 3, 1977

[51] Int. Cl.$^2$ .................. C03B 23/02; C03B 27/00
[52] U.S. Cl. .................................. 65/114; 65/104; 65/273; 65/268
[58] Field of Search ............... 65/104, 114, 273, 275, 65/268

[56] References Cited
U.S. PATENT DOCUMENTS

| 2,957,277 | 10/1960 | White et al. | 65/290 X |
| 3,684,473 | 8/1972 | Ritter, Jr. | 65/104 |
| 3,723,085 | 3/1973 | McMaster | 65/273 X |
| 3,846,104 | 11/1974 | Seymour | 65/104 |

Primary Examiner—Arthur D. Kellogg
Attorney, Agent, or Firm—Dennis G. Millman; Edward I. Mates

[57] ABSTRACT

This invention relates to method and apparatus for handling glass sheets during shaping and cooling. Each glass sheet to be treated in turn is heated to its deformation temperature and conveyed through a furnace and into a glass shaping station by a roller conveyor. The glass is lifted into engagement with a vacuum shaping mold while hot and held against the vacuum shaping mold by vacuum as the glass lifting mechanism retracts downward. A tempering ring having an outline supporting surface conforming to and slightly inside the periphery of the bent glass sheet is brought into position below the upper vacuum mold. The vacuum on the upper mold is released to deposit the shaped glass sheet on the tempering ring. The latter supports and transfers the bent glass sheet during movement into a cooling station where the shaped glass sheet is quenched as rapidly as possible to harden the glass surface and enable a plurality of rotating rolls to lift the hardened glass sheet from the tempering ring and convey it onto additional conveyor rolls which transport the shaped glass between additional streams of cooling medium such as air blasts that impart at least a partial temper to the glass. When the glass is transferred to the additional conveyor rolls, the rotating transfer rolls are lowered to clear the path of movement for the tempering ring to return to the shaping station where the cycle is repeated.

8 Claims, 11 Drawing Figures

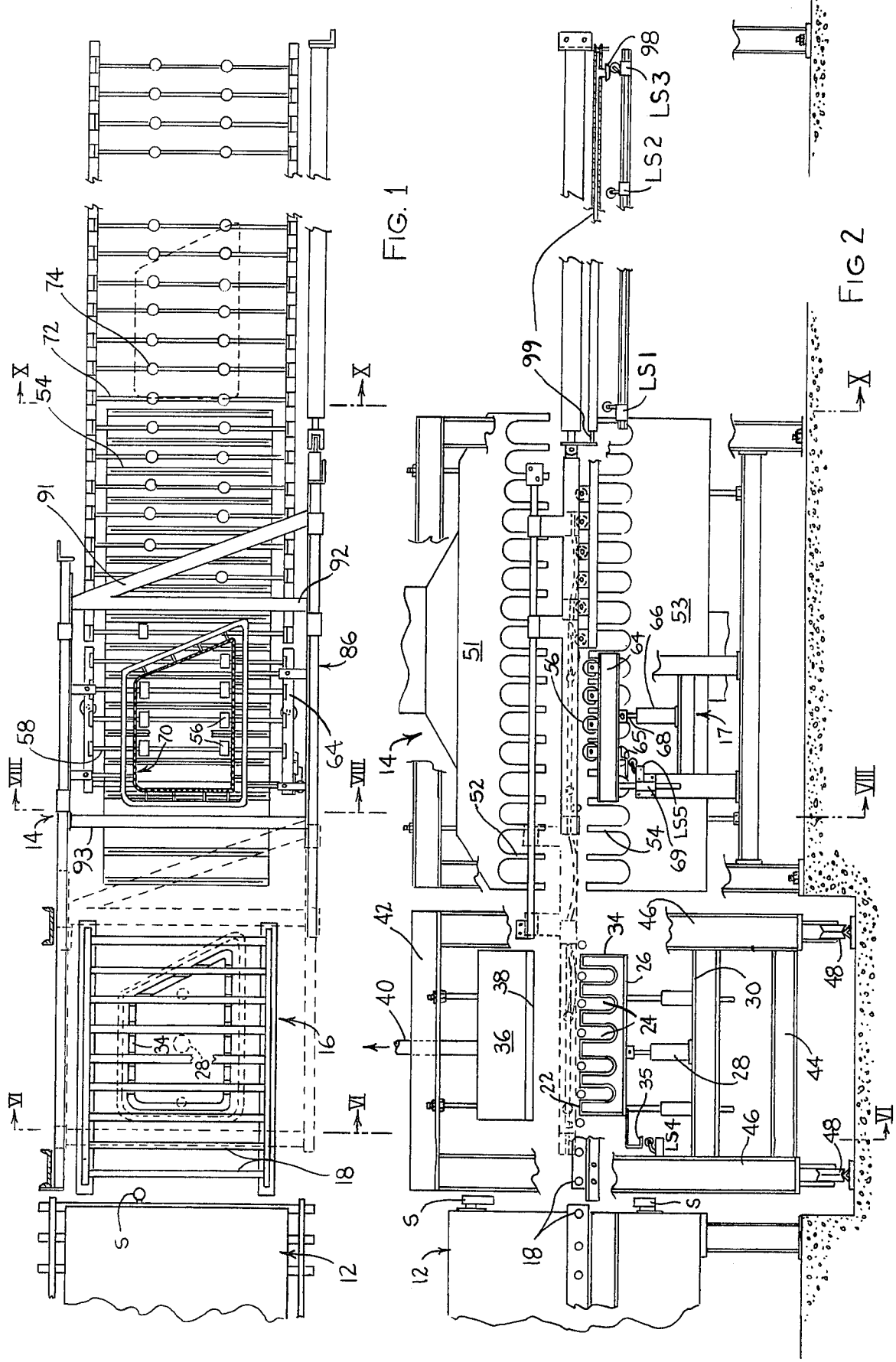

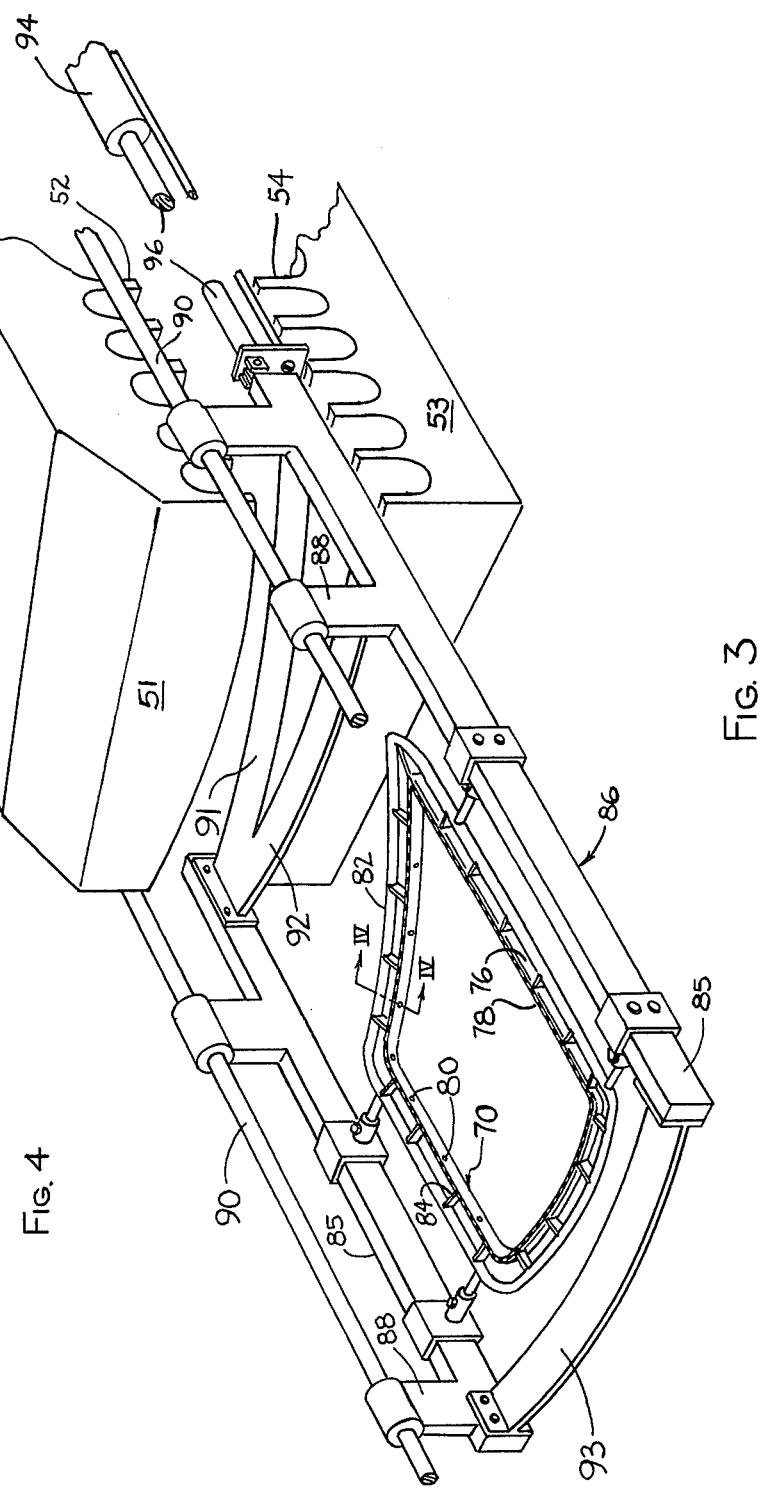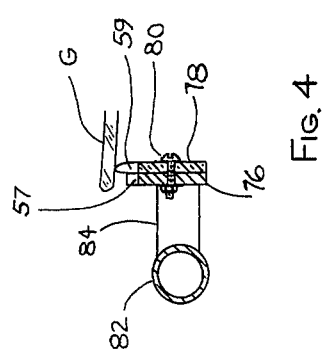

METHOD AND APPARATUS FOR HANDLING GLASS SHEETS FOR SHAPING AND COOLING

BACKGROUND OF THE INVENTION

This invention relates to the shaping and cooling of glass sheets and particularly relates to a high speed production of bent glass sheets that are toughened by air quenching. In the past, glass sheets were conveyed through a furnace on one of several types of conveyors and heated while passing through the furnace to a temperature approaching the glass softening point. Immediately beyond the furnace, each glass sheet in turn was lifted by a lower outline mold which raised the glass sheet into engagement with an upper mold having a shape conforming to that desired for the glass. The shaped glass sheet was then transferred in some manner to a cooling station.

U.S. Pat. No. 3,846,104 to Seymour provides a faster bending and tempering cycle than the prior art by providing method and apparatus in which the lower shaping mold moves only vertically at the shaping station, the upper vacuum mold remains at the shaping station and holds the shaped glass sheet thereagainst as the lower shaping mold retracts to below the level of the conveyor, and means to support a glass sheet adjacent its marginal or peripheral edge only, preferably comprising a tempering ring, moves generally horizontally between the shaping station and the cooling station so that it is possible to cool one glass sheet while another is being shaped, thus making it possible to reduce the duration of a shaping and cooling cycle. The apparatus in the Seymour patent uses a vacuum pickup to remove a bent, cooled glass sheet from the tempering ring and deposit the glass on an additional conveyor.

U.S. Pat. No. 2,957,277 to White and Carson transfers a bent glass sheet from an outline mold on which it is supported to a roller conveyor by means of a device that supports the glass inward of the outline mold support for lifting. Hook-like members engage the lifted glass above the mold shaping surface and transfer the glass to stub rolls that convey the glass sheets through the remainder of an annealing lehr.

SUMMARY OF THE INVENTION

The present invention further improves the efficiency of a glass sheet bending and cooling apparatus by providing novel means for removing each bent glass sheet after the latter has had its surfaces hardened sufficiently to permit it to be conveyed on an auxiliary conveyor providing a glass sheet surface at an elevation slightly higher than the level at which the glass sheet is supported by the tempering ring.

The transfer mechanism for removing the glass from the tempering ring to the additional conveyor comprises a frame support and a lifting and lowering mechanism for raising and lowering the frame support and a plurality of rotating conveyor rolls having doughnut-shaped support members carried by the frame support between a recessed position clear of the movement of the tempering ring and its support carriage and a transfer position wherein the rotating conveyor rolls have a common upper tangential surface and provide rotating elements of a glass sheet supporting surface disposed above the level of support provided by the tempering ring and at a level of support provided by the upper tangential surface common to the additional conveyor rolls.

The present invention will be better understood in the light of a description of an illustrative embodiment that follows, which description includes the accompanying drawings where like reference numbers refer to like structural elements.

BRIEF DESCRIPTION OF THE DRAWINGS

FIG. 1 is a fragmentary, plan view of apparatus incorporating a preferred embodiment of the present invention, with certain parts omitted for clarity, with solid lines showing a tempering ring supporting a glass sheet at a transfer station and phantom lines showing the position of the tempering ring at a shaping station and that of a glass sheet conveyed on additional conveyor rolls en route to an unloading station;

FIG. 2 is a fragmentary, longitudinal view of the embodiment of FIG. 1 with certain parts omitted or broken awau to show other parts more clearly and with certain positions depicted in phantom consistent with FIG. 1;

FIG. 3 is a fragmentary perspective view of a tempering ring and its reinforcing and supporting and actuating means depicting the tempering means in a position outside a cooling station;

FIG. 4 is an enlarged cross-section of a portion of the tempering ring and its reinforcing means taken along the lines IV—IV on FIG. 3;

DESCRIPTION OF THE PREFERRED EMBODIMENT

Figure 5:
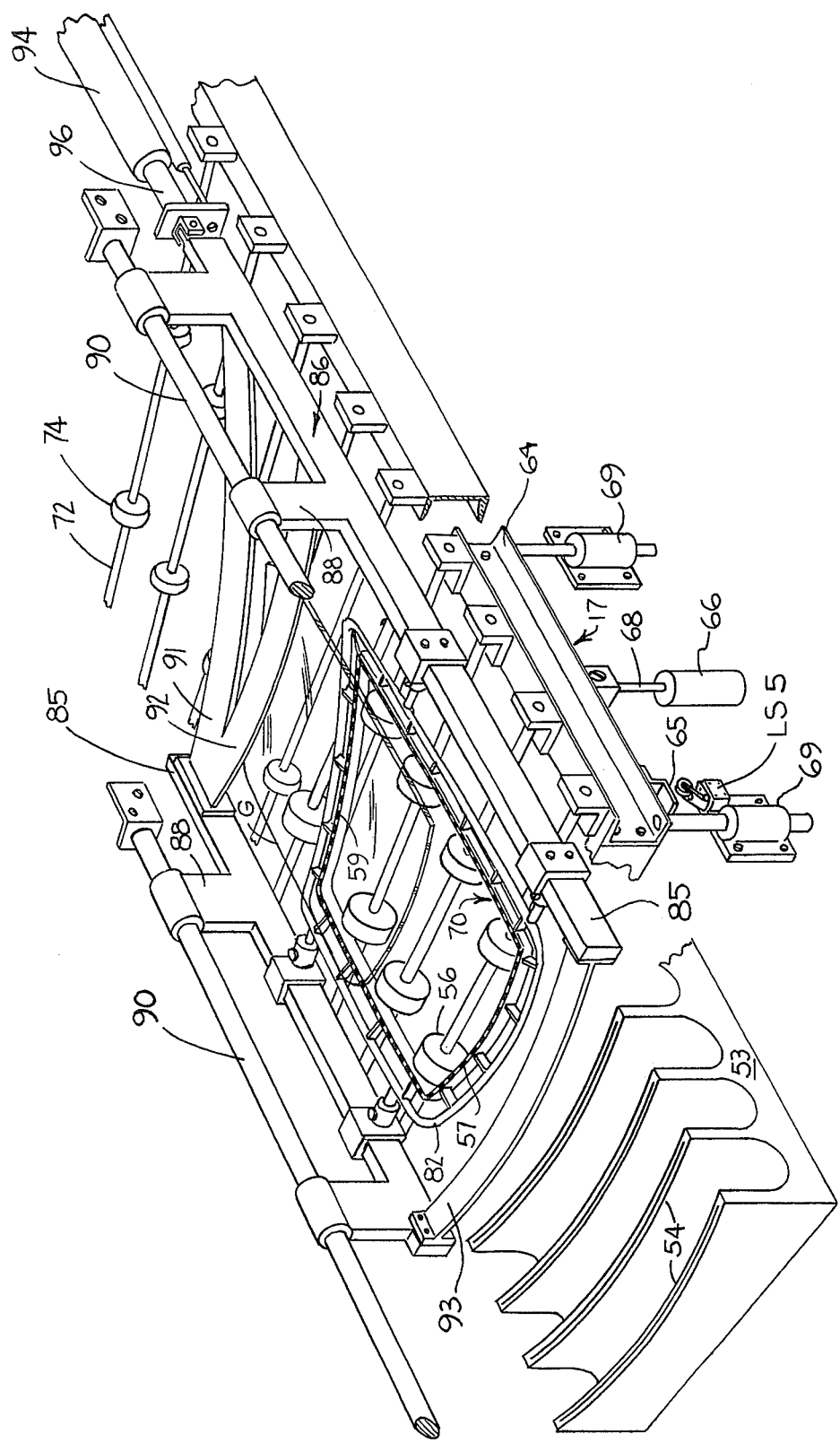
FIG. 5 is a fragmentary perspective view showing the tempering ring at the cooling station with rotating rolls lifting the glass sheet in the process of transferring the latter to additional conveyor rolls.

Referring now to FIGS. 1 and 2 of the drawings, an apparatus for treating and shaping sheets of material, such as glass, includes a heating means including a furnace 12 through which sheets of glass are conveyed from a loading station (not shown) while being heated to the glass deformation temperature. A cooling station generally indicated at 14 for cooling the curved sheets of glass and an unloading station beyond the cooling station 14 are located in end-to-end relation to the right of the furnace 12. An intermediate or shaping station 16 is disposed between the furnace 12 and the cooling station 14. An important part of this invention is sheet transfer means 17 located in the cooling station 14.

Heat may be supplied in the furnace 12 by hot gases from gas burners or by electrical radiant heaters or by a conbination of both which are well known in the art. The heating means includes a horizontal conveyor comprising longitudinally spaced, transversely extending conveyor rolls 18 which extends through the furnace 12 and the shaping station 16. The rolls of the conveyor are arranged in sections and their rotational speed controlled through clutches (not shown) so that the speed of the different conveyor sections may be controlled and synchronized in a manner well known in the art. A glass sensing element S is located beyond the exit of furnace 12 to initiate a cycle of operation of this apparatus. Limit switches LS-1 through LS-5 are provided to synchronize the operation of various elements of the apparatus according to a predetermined sequence. The glass sensing element S and the limit switches LS-1 through LS-5 cooperate to provide synchronizing means for the apparatus of the present invention.

Figure 6:
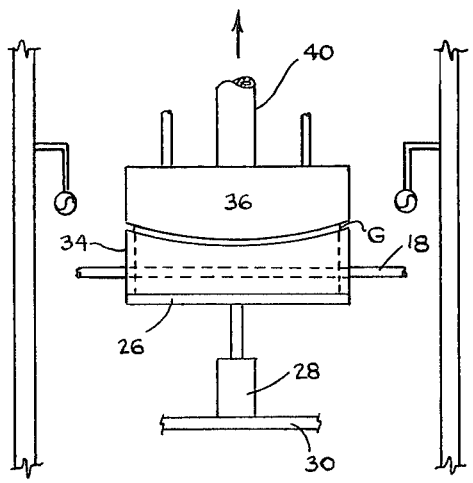
FIG. 6 is a schematic, cross-sectional view taken along lines VI—VI at a shaping station of the embodiment of FIGS. 1 and 2, showing a glass sheet being engaged between an upper vacuum shaping mold and a lower outline shaping mold after having been heated while passing through a furnace.
Figure 7:
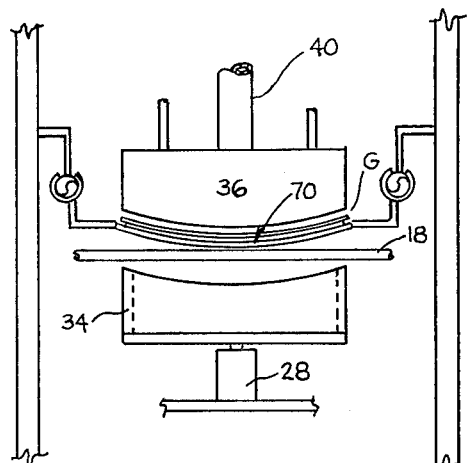
FIG. 7 is a view similar to FIG. 6 showing a tempering ring located in alignment below a shaped glass sheet supported thereon beneath an upper mold with the lower mold retracted to provide clearance to permit entrance of the tempering ring in the shaping station.
Figure 11:
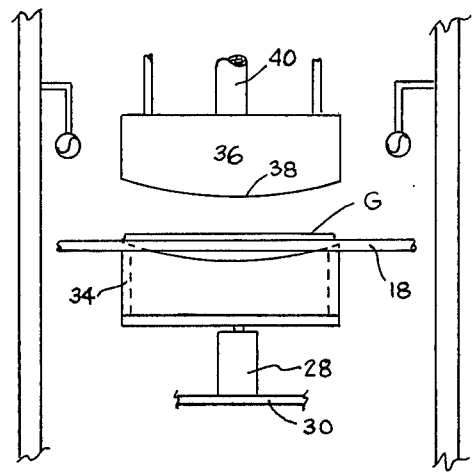
FIG. 11 is a fragmentary, sectional view similar to FIGS. 6 and 7, showing the positions occupied by the upper vacuum shaping mold and the lower outline shaping mold of the shaping station when a succeeding flat, heated glass sheet enters the shaping station.

The shaping station 16 comprises a lower outline shaping mold 34 and an upper vacuum shaping mold 36, both composed of metal covered with a refractory material such as fiber glass as is well known in the art. The former comprises a metal ring having an upper edge surface 22 conforming in elevational shape and plan outline to the shape desired for a glass sheet to be bent. The upper edge surface 22 is interrupted by intermittent grooves 24 which provide clearance for raising and lowering the lower outline shaping mold 34 between a recessed position below the conveyor rolls 18, as depicted in FIGS. 2, 7 and 11, and an upper position above the level of said conveyor rolls, as depicted in FIG. 6. The lower outline shaping mold 34 is supported on a frame-type lower mold support 26. The latter, in turn, is raised and lowered by raising and lowering means in the form of piston 28 rigidly mounted to a piston support platform 30. A lug 35 is connected to mold 34 to actuate the limit switch LS-4.

The upper vacuum mold 36 has a lower wall 38 that is apertured and that is shaped to be complemental to the shaping surface formed by the upper edge surface 22 of the lower outline shaping mold 34. the upper vacuum mold 36 communicates with a source of vacuum (not shown) through an evacuation pipe 40 and a suitable valve (not shown). The upper vacuum mold 36 is suitably connected to an upper supporting frame 42 to which the upper vacuum mold may be either rigidly attached or attached for relative motion between the upper vacuum model 36 and the upper mold supporting frame 42, as desired. The evacuation pipe 40 may be connected through a suitable valve arrangement to a source of pressurized air (not shown) and the valves for the vacuum line and for the pressure line synchronized according to a predetermined time cycle in a manner well known in the art.

The shaping station 16 also includes a lower platform 44. Vertical posts 46 interconnect the corners of the upper mold supporting frame 42, the piston support platform 30 and the lower platform 44 to provide a unitary structure. Wheels 48 are mounted on the unitary structure to permit the shaping station 16 to be readily removed from a position of alignment between the exit of the furnace 12 and the entrance to the cooling station 14 and an offset position to facilitate maintenance of the structural elements of the shaping station 16.

The cooling station 14 comprises an upper plenum 51 provided with longitudinally spaced, horizontally extending nozzles 52 having slot openings extending downward to permit air applied under pressure to the upper plenum to be directed through the upper nozzles 52 toward the upper surface of a glass sheet that is aligned with the bottom openings of the nozzles. Opposing the upper plenum 51 is a lower plenum 53 provided with lower nozzles 54 having slot-type openings directed upward so that air applied under pressure to the lower plenum 53 is directed against the lower major surface of a glass sheet in alignment with the slot-type openings of the lower nozzles 54. The slot-type openings of the nozzles are of complementary arcuate curvature and spaced apart sufficiently to provide clearance for moving a tempering ring 70 to be described later along a path between said arcuate openings. If desired, the plenums 51 and 53 may be sectionalized so that different air pressures may be provided for the air imparted into the various sections of the upper plenum and into the various sections of the lower plenum so as to provide a cycle of air blasts in the cooling station 14.

The sheet transfer means 17 at the cooling station 14 includes a vertically movable conveyor section comprising a set of doughnut rolls 56 having a relatively large diameter mounted on thin shafts 58 which are driven from a gear box and a motor (not shown) mounted on a frame 64. A lug 65 is connected to frame 64 to actuate the limit switch LS-5. Elevator means 66 in the form of one or more pistons is rigidly supported (each with a piston rod 68) on said frame. Movement of the frame 64 is controlled by vertical guides 69 in such a manner that when piston rods 68 are extended, the set of spaced doughnut rolls 56 is lifted in unison into positions where their common upper tangential plane lies in a horizontal plane above the uppermost portion of the shaping surface of a tempering ring 70 so as to transfer glass sheets therefrom.

The cooling station 14 also comprises additional conveyor shafts 72 downstream of the transfer means 17. Each additional conveyor shaft 72 is provided with a pair of additional doughnut rolls 74 fixed thereto for rotation therewith. The shafts 72 are longitudinally spaced from one another and the upper surfaces of the additional doughnut rolls 72 are rigidly supported with their common upper tangent occupying a horizontal plane slightly above the uppermost surface of tempering ring 70.

FIGS. 3, 4 and 5 show in some detail the construction of the tempering ring 70. A preferred embodiment of the latter is shown in U.S. Pat. No. 3,973,943 to Seymour and comprises a continuous outline metal rail 76 that extends in the form of a closed ring-like structure disposed edgewise with its width forming the height of the rail attached for reinforcement to a series of non-metallic bars or bar portions 78 formed from cutting a board of non-metallic material such as an electric insulator material that is sold as SYNTHANE G-7 electric board by the Synthane Taylor Co. of Valley Forge, Pennsylvania. This material is composed of a series of fiber glass layers bonded together with an epoxy resin believed to be a highly cured methyl phenyl silicone. The bar portions 78 have a low heat conductivity and are of a low expansion material and are approximately 3 millimeters thick. Each of the non-metallic bar portions has a desired shape conforming to the shape of a different portion of the metal rail 76 except that the vertical heights of bars 78 are higher than the height of the metal rail 76. Each bar 78 is secured to the inner surface of the rigid metal rail 76 by nut and bolt means 80 spaced throughout the peripheral length of the reinforcing metal rail 76 and extending through aligned bolt-receiving openings in the rigid metal rail 76 and the bar portions 78. The bottom edges of the bar portions 78 are aligned with the bottom edge of the rigid metal rail 76, although this is not absolutely necessary except that in such an arrangement the full height of the metal rail is provided in side-by-side relation to the bar portions 78 to reinforce the structural rigidity of the bar portions of non-metallic material.

The upper edge of each bar portion 78 of non-metallic material is disposed above the upper edge surface of the reinforcing rigid metal rail 76 so that when glass is deposited on the tempering ring 70, it makes contact only with the non-metallic glass engaging means provided by the bar portions 78 that are reinforced by the rigid metal rail in spaced relation below the line of glass sheet contact. The distance between the glass supporting surface of the bar portions above the upper edge of the rigid reinforcing metal rail is preferably sufficient to provide a path of heat conduction through said non-metallic bar portions of sufficient length to have minor detrimental effects only in the cooling of the glass contacting portion, yet not so long as to endanger the structural strength of the non-metallic bar portions.

In a typical apparatus as shown in FIG. 4, the reinforcing metal rail 76 is provided with notches 57 to provide paths of escape for air blasts that are applied against the supported glass sheet in the glass cooling station 16. The non-metallic bar portions 78 are similarly constructed with notches 59 deeper than the notches 57 of the rigid metal rail 76 and aligned with said notches 57. The glass engaging edges of the non-metallic bar portions 78 are approximately 3 millimeters above the upper edge of the reinforcing metal ring 76 so that the glass sheet is supported in spaced relation to any metal and only contacts the non-metallic bar portions 78 of the tempering ring 70.

The tempering ring 70 is suitably reinforced by a continuous outer steel pipe 82 of continuous ring construction with spaced connecting means 84 interconnecting circumferentially spaced portions of the tempering ring 70 to the outer steel pipe 82. The outer steel pipe 82 is connected to longitudinally extending bars 85 to a carriage 86. The latter is provided with ears 88 that are slidably supported relative to a pair of longitudinally extending support bars 90 to guide the movement of the tempering ring 70 between an upstream position at shaping station 16, a downstream position in alignment with transfer means 17 and an intermediate position just downstream of the shaping station, as is depicted in FIG. 3. The bars 85 of carriage 86 are interconnected by several arcuate cross braces 91, 92 an 93 shaped to conform with the curved shape of the upper ends of the slot nozzles 54 and the lower ends of the slot nozzles 52 so as to be capable of moving therebetween.

The doughnut rolls 56 of the shaped glass transfer means 17 are arranged in spaced, parallel rows. In case the glass sheets handled are of non-rectangular outline, as shown in FIG. 1, a rigidly supported stub roll 60 replaces one of the vertically movable rolls 56 beyond the outline of the tempering ring 70. At their upper positions, the stub rolls 56 have an upper common tangent in the same horizontal plane as the upper common tangent of the additional doughnut rolls 74 and of any rigidly supported rolls 60 that may be present. At their lower positions, rolls 56 are located below the path taken by tempering ring 70.

A motion actuating means 94 in the form of a horizontally extending piston has the distal end of its piston rod 96 connected to the downstream end of one of the longitudinally extending bars 85 of the carriage 86 so as to control the position of the carriage 86 and its supported tempering ring 70 relative to one of the three positions of rest occupied by the tempering ring 70 during a cycle of operation. Limit switches LS-1 through LS-3 are provided for actuation of a lug 98 on a carriage extension arm 99 to control the cycle of movement of tempering ring 70 to be explained subsequently.

CYCLE OF OPERATION

FIGS. 6 to 11 depict a cycle of operation. In FIG. 6, a glass sheet G is being engaged simultaneously between the lower outline shaping mold 34 and the upper vacuum mold 36. At this moment, the tempering ring 70 is in its intermediate position with lug 98 engaging limit switch LS-2. Vacuum is supplied to the vacuum chamber of upper vacuum mold 36 to hold the shaped glass sheet G against the apertured lower wall 38 of the upper vacuum mold 36 so that the glass sheet will remain in contact with said apertured lower wall 38 when lower outline shaping mold 34 is retracted. The lower outline shaping mold 34 has been lifted in response to the sensor S actuating a timer circuit (not shown) that extends the piston 28 on sensing the passage of a glass sheet G into the shaping station 16. Limit switch LS-4 is released by the lifting of mold 34 to actuate the vacuum for upper vacuum mold 36.

In FIG. 7, lower outline shaping mold 34 has retracted, thereby resetting limit switch LS-4 and bringing tempering ring 70 into position beneath the upper vacuum mold 36. When lug 98 engages limit switch LS-1, tempering ring 70 is stopped at its aforesaid upstream position. In addition, limit switch LS-1 releases the vacuum in upper vacuum mold 36, thereby permitting glass sheet G to be deposited onto tempering ring 70 at the upstream position.

Figure 8:
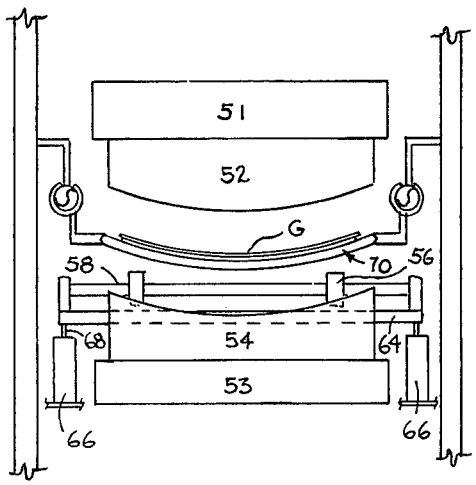
FIG. 8 is a schematic, sectional view taken along lines VIII—VIII at a transfer conveyor station located at a cooling station of the embodiment of FIGS. 1 and 2, showing the transfer conveyor section in retracted position as the tempering ring arrives at the transfer station.

In FIG. 8, the glass sheet G is supported on tempering ring 70, which is moving downstream between the upper slot-type nozzles 52 having convexly curved downward ends and the lower slot-type nozzles 54 having concavely curved upper ends and air is blasted through the nozzles 52 and 54. The doughnut rolls 56 and their thin shafts 58 at transfer means 17 are in the downward retracted position with frame 64 being retracted downwardly by the retraction of the piston rods 68 actuated by elevator means 66 while awaiting the arrival of the tempering ring 70 into position wherein lug 98 engages limit switch LS-3.

Figure 9:
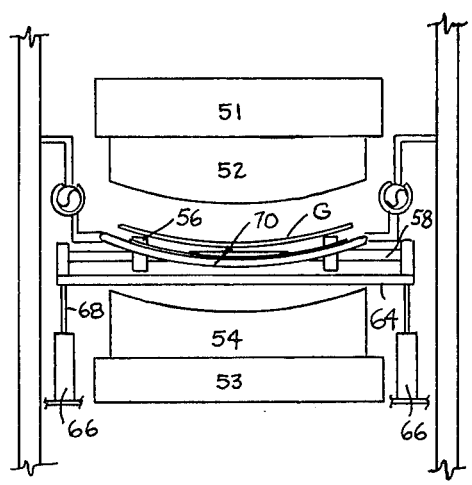
FIG. 9 is a fragmentary view similar to FIG. 8 showing the transfer conveyor section rolls lifted to lift the shaped glass sheet above the tempering ring for transfer to an additional conveyor section located beyond the transfer conveyor section.

In FIG. 9, a timer circuit actuated by limit switch LS-3 has caused the elevator means 66 to raise the pistons 68, thereby lifting frame 64, shafts 58 and rotating doughnut rolls 56 into position preparatory to lifting glass sheet G above the supporting surface of the tempering ring 70. This movement releases limit switch LS-5.

Figure 10:
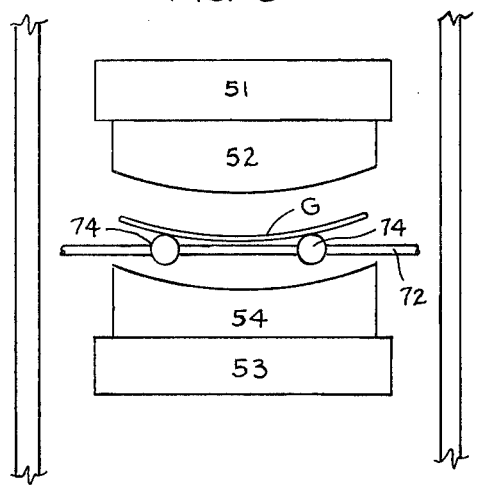
FIG. 10 is a fragmentary, sectional view taken along lines X—X across a portion of the cooling station occupied by the additional conveyor section showing how the additional conveyor section transports the shaped glass between nozzles for further cooling.

In FIG. 10, rolls 56 have transferred the glass sheet G to the doughnut rollers 74 fixed to additional conveyor shafts 72. At this time, the timer circuit controlled by limit switch LS-3 has caused the elevator means 66 to retract the piston rods 68, thereby lowering the doughnut rolls 56 and their thin shafts 58. This lowering actuates limit switch LS-5, which causes the motion actuating means in the form of horizontal pistons 94 to extend piston rod 96 to move the carriage 86 in an upstream direction into a position where lug 98 engages limit switch LS-2, thereby permitting tempering ring 70 to be in its intermediate position to await the completion of the shaping of a succeeding glass sheet. However, if the apparatus operates rapidly enough, as indicated by a subsequent actuation of sensing means S, the tempering ring moves upstream through the intermediate position without stopping at the intermediate position.

During the time that the tempering ring moves into or through the intermediate position controlled by the engagement of lug 98 against limit switch LS-2, lower outline shaping mold 34 remains retracted sufficiently to provide clearance for the succeeding glass sheet G to enter into a position of alignment between the upper vacuum mold and the lower outline shaping mold 34, as depicted in FIG. 11.

An important benefit derived from the present invention is the rapid transfer of each glass sheet G from the tempering ring 70 onto the upwardly moving doughnut rolls 56. In order to effect the latter, it is preferred that the thin shafts 58 on which the doughnut rolls 56 are mounted be rotating when the set of rolls 56 is lifted into position above that occupied by the lower surface of the glass sheet G resting on the tempering ring 70. The rolls 56 may rotate continuously or intermittently. In the latter case, it is imperative that the rolls 56 rotate during the portion of their cycle of vertical movement when they engage the lower surface of a glass sheet being transferred.

In order to avoid marking the glass during its transfer from the set of doughnut rolls 56 to the rotationg additional doughnut rollers 74 fixed for rotation to the additional conveyor shafts 72, the peripheral speed of the vertically movable rolls 56 and of any rigid rolls 60 is equal to the peripheral speed of the doughnut rollers 74.

The present invention permits each glass sheet in a series of sheets to be heated to its deformation temperature, shaped to the desired configuration at the shaping station 16, supported by vacuum against the upper vacuum shaping mold 36 while the lower outline shaping mold is retracted and the tempering ring 70 is introduced into a position aligned below upper vacuum shaping mold 36. The shaped glass sheet G is supported adjacent its marginal edge with its upper and lower major surfaces exposed to blasts of cool tempering medium, such as air or any other suitable well-known tempering medium, during the conveyance of the shaped glass sheet G to the transfer means 17. The rotation of the vertically moving doughnut rolls 56 as they engage the glass sheet G causes as rapid a transfer as possible to the additional doughnut rolls 74 after the major surfaces have hardened sufficiently to avoid scuffing of the glass surface. Since the glass sheets undergoing transfer are moving during their transfer, they are not as subject to distortion as they would be if they were supported by transfer means that engages the viewing portion of the article resulting from the treatment with no relative movement therebetween as in the vacuum transfer means of U.S. Pat. No. 3,846,104 of Seymour or hook means as in U.S. Pat. No. 2,957,277 of White and Carson.

The form of the invention shown and described in this disclosure represents an illustrative preferred embodiment thereof. It is understood that various changes may be made in the structure and method of operation without departing from the gist of the invention except insofar as defined in the claimed subject matter that follows.

We claim:

1. A method of tempering a bent glass sheet comprising:

in a bending station, depositing a heated, newly bent glass sheet onto a horizontally disposed support ring conforming in outline and elevation to marginal portions of the bent glass sheet;

transferring the bent glass sheet on the support ring from the bending station into a first portion of a tempering station wherein blasts of tempering medium are directed onto the sheet to initiate tempering thereof;

after surface portions of the sheet have been cooled sufficiently to resist scuffing and marking but before tempering is completed, lifting the sheet off the support ring by bringing a set of spaced elevator rolls into contact with the underside of the sheet within the outline of the support ring and providing relative vertical motion between the support ring and the elevator rolls to thereby support the sheet on the elevator rolls at an elevation above the upper extent of the support ring and in alignment with a roll conveyor extending into a second portion of the tempering station;

rotating the elevator rolls to convey the sheet onto the roll conveyor and into the second portion of the tempering station;

applying blasts of tempering medium onto the sheet in the second portion of the tempering station to complete tempering of the sheet;

and after the sheet has entered the second portion of the tempering station, restoring the relative elevations of the elevator rolls and the support ring to locate the elevator rolls below the lower extent of the support ring and translating the support ring out of the tempering station toward the bending station to receive a subsequent bent glass sheet.

2. The method of claim 1 wherein the support ring reciprocates in a substantially horizontal plane only and vertical motion is imparted to the elevator rolls to lift the glass sheet from the support ring.

3. The method of claim 1 wherein the support ring stops at an intermediate location between the elevator rolls and the bending station prior to receiving a subsequent bent glass sheet.

4. The method of claim 1 wherein each glass sheet is shaped and supported by vacuum shaping means in the bending station and each glass sheet is deposited onto the support ring by aligning the support ring below said vacuum shaping means and releasing the vacuum on said vacuum shaping means.

5. The method of claim 1 wherein the elevator rolls are rotated continuously.

6. The method of claim 1 wherein the elevator rolls are rotated intermittently, rotation being initiated upon contact with the underside of a glass sheet on the support ring.

7. Apparatus for tempering bent glass sheets, comprising:

a tempering station adjacent to a glass sheet bending station, a horizontally disposed support ring conforming in outline and elevation to marginal portions of a bent glass sheet to enable said sheet to be supported thereon, means for reversibly moving the support ring between the bending station and a first portion of the tempering station, said first portion and a second portion of the tempering station each having upper and lower sets of nozzles for directing blasts of tempering medium onto opposite sides of a glass sheet being conveyed therebetween, said first portion including an elongated opening between said upper and lower sets of nozzles for receiving the support ring and a bent glass sheet resting thereon along a generally horizontal path of travel, said second portion including a roll conveyor between said upper and lower sets of nozzles for supporting and horizontally conveying a bent glass sheet therebetween along a second path of travel at a higher elevation than said first path of travel, a set of elevator rolls within the first portion of the tempering station at a location adjacent to the second portion of the tempering station and lying directly below said horizontal path of travel of the support ring so as to be periodically vertically aligned within the outline of the support ring and in alignment with said roll conveyor, vertical reciprocator means for reversibly bringing the upper extent of the elevator rolls above the upper extent of the support ring within the outline of the support ring so as to lift a glass sheet from the support ring into alignment with the upper surface of said roll conveyor, means to rotate the elevator rolls in unison to convey a glass sheet lifted from the support ring onto said roll conveyor and into the second portion of the tempering station, whereby tempering of the glass sheet initiated in said first portion may be completed in said second portion while the support ring is being returned toward the bending station.

8. The apparatus of claim 7 wherein said vertical reciprocator means includes piston means engaging said set of elevator rolls and adapted to alternately elevate the elevator rolls above the horizontal path of the support ring within the outline of the support ring and retract the elevator rolls to a lowered position below the lower extent of the support ring.

* * * * *